(12) United States Patent
Buckingham et al.

(10) Patent No.: US 11,142,384 B2
(45) Date of Patent: Oct. 12, 2021

(54) ONE-WAY VALVE

(71) Applicant: O2I LTD., Uxbridge (CA)

(72) Inventors: Robert Buckingham, Uxbridge (CA); Willem Anker, Port Perry (CA)

(73) Assignee: O2I, Uxbridge (CA)

( * ) Notice: Subject to any disclaimer, the term of this patent is extended or adjusted under 35 U.S.C. 154(b) by 360 days.

(21) Appl. No.: 16/315,565

(22) PCT Filed: Jul. 5, 2017

(86) PCT No.: PCT/CA2017/050813
§ 371 (c)(1),
(2) Date: Jan. 4, 2019

(87) PCT Pub. No.: WO2018/006172
PCT Pub. Date: Jan. 11, 2018

(65) Prior Publication Data
US 2019/0177069 A1     Jun. 13, 2019

Related U.S. Application Data

(60) Provisional application No. 62/358,605, filed on Jul. 6, 2016.

(51) Int. Cl.
*B65D 77/22*     (2006.01)
*B65D 47/32*     (2006.01)
(Continued)

(52) U.S. Cl.
CPC ........... *B65D 77/225* (2013.01); *B65D 47/32* (2013.01); *B65D 85/8043* (2013.01);
(Continued)

(58) Field of Classification Search
CPC ......... Y10T 137/7879; Y10T 137/4358; Y10T 137/7895; B65D 77/225; B65D 47/32;
(Continued)

(56) References Cited

U.S. PATENT DOCUMENTS 2,097,585 A   11/1937  Carson
2,821,338 A   1/1958   Metzger
(Continued)

FOREIGN PATENT DOCUMENTS

GB    2526548 A      12/2015
WO    2013/162636 A1 10/2013

OTHER PUBLICATIONS

Extended European Search Report dated Mar. 10, 2020, for corresponding European Application No. 17823376.3.
International Search Report and Written Opinion dated Sep. 29, 2017 for corresponding PCT/CA2017/050813.

*Primary Examiner* — Jessica Cahill
(74) *Attorney, Agent, or Firm* — Kinney & Lange, P.A.

(57) ABSTRACT

A one-way valve to control the release of pressurized gas from within a sealed container through a venting aperture. The valve comprises a layer of flexible material having an upper and a lower surface with a portion of the upper surface adhered to a surface of the container and overlaying the venting aperture. A channel is defined by a portion of the container and an adjacent portion of the flexible material which has not been adhered to the container. The channel is in communication with the venting aperture and an exhaust gas aperture in the layer of flexible material. The channel is operable between a closed and an open configuration upon gas pressure within the container exceeding a predetermined limit. When open the channel permits gas to flow from said container into the exterior atmosphere. When closed the channel restricts the flow of gas between the venting aperture and exhaust gas aperture.

6 Claims, 6 Drawing Sheets

(51) Int. Cl.
*F16K 17/18* (2006.01)
*F16K 15/14* (2006.01)
*F16K 15/18* (2006.01)
*F16K 17/02* (2006.01)
*F16K 17/04* (2006.01)
*B65D 85/804* (2006.01)

(52) U.S. Cl.
CPC ............ *F16K 15/14* (2013.01); *F16K 15/144* (2013.01); *F16K 15/185* (2013.01); *F16K 17/02* (2013.01); *F16K 17/0453* (2013.01); *F16K 17/18* (2013.01); *Y10T 137/4358* (2015.04); *Y10T 137/7879* (2015.04); *Y10T 137/7895* (2015.04)

(58) Field of Classification Search
CPC ... B65D 85/8043; F16K 15/14; F16K 15/144; F16K 15/185; F16K 17/02; F16K 17/0453; F16K 17/18
See application file for complete search history.

(56) References Cited

U.S. PATENT DOCUMENTS

| | | | |
|---|---|---|---|
| 5,584,409 A * | 12/1996 | Chemberlen | B65D 77/225 |
| | | | 220/373 |
| 5,992,635 A | 11/1999 | Walters | |
| 6,182,850 B1 * | 2/2001 | Marbler | B65D 77/225 |
| | | | 220/359.3 |
| 6,663,284 B2 * | 12/2003 | Buckingham | B65D 77/225 |
| | | | 220/203.15 |
| 8,434,633 B2 | 5/2013 | Beer et al. | |
| 9,657,856 B2 | 5/2017 | Buckingham | |
| 10,281,050 B2 * | 5/2019 | Branyon | B32B 27/34 |
| 10,442,589 B2 * | 10/2019 | Branyon | B32B 7/04 |
| 2015/0102030 A1 * | 4/2015 | Gardner | B65D 25/00 |
| | | | 220/62.11 |
| 2015/0135967 A1 | 5/2015 | Hoffman et al. | |
| 2018/0029790 A1 * | 2/2018 | Empl | B65D 77/24 |

* cited by examiner

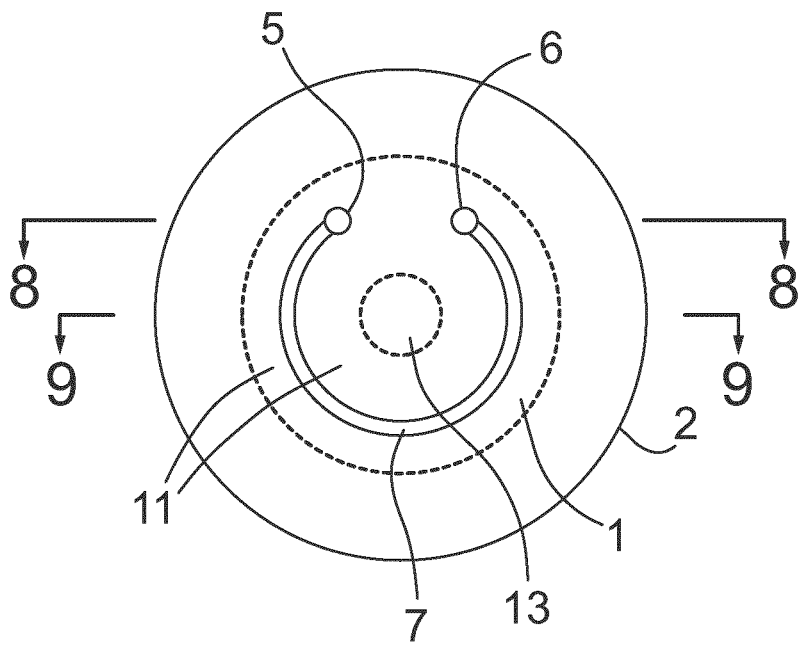
Fig. 7
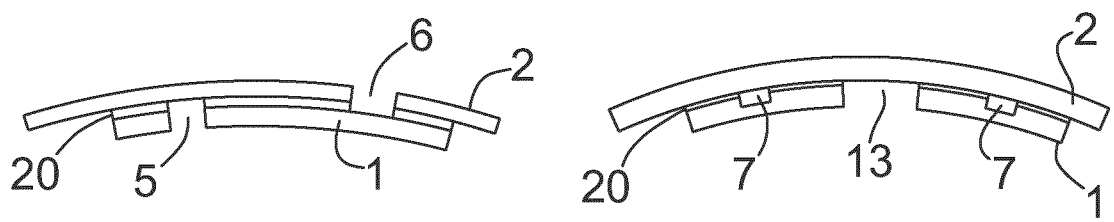
Fig. 8
Fig. 9
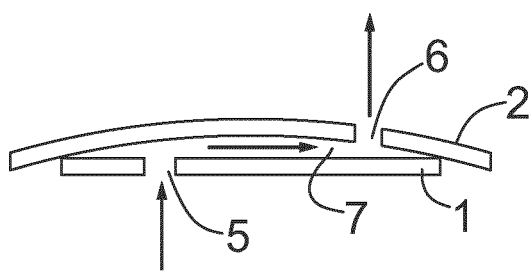
Fig. 10

ONE-WAY VALVE

FIELD

The invention relates to a one-way valve. In one embodiment the invention relates to a one-way valve that will allow the release of built up gasses within a package, vessel or container.

BACKGROUND

There are numerous products on the market that purport to be one-way valves that can be used on packaging. Such valves have various rates of success in terms of opening and closing when required to relieve internal pressure or to avoid the ingress of the outside atmosphere. An example of a packaged product for which one-way valves are used is roasted coffee.

Coffee, once roasted, can start to degrade (become stale) almost immediately if exposed to oxygen, undesirable odours and/or moisture. Depending on the degree of degradation and the sophistication of the consumer, there can be a noticeable effect on the price of the end product and even its salability. To preserve the "freshness" of roasted coffee it is preferable to package the coffee as soon as possible after roasting. The difficulty that this causes is largely due to the release of carbon dioxide and other gasses from the coffee following roasting. That release of gas can continue in some instances for weeks. The time period for degassing is dependent on a number of factors which include, but are not limited to, roast temperature, grind size, quench type and amount, bean origin, outside temperature, atmospheric pressure, humidity, quantity being stored, and various other factors. If coffee that has not been allowed to sufficiently degas is packaged in a vessel that does not contain some form of relief mechanism, built-up internal gas pressure will tend to expand the vessel or container, and may eventually result in a catastrophic failure allowing the product to be exposed to the outside elements. Where failure does not occur, the packaging may become expanded or deformed, to a point where it no longer "fits" properly on shelves of a retail establishment. Consumers also tend to avoid purchasing products where the container or packaging is deformed or expanded. As a result, to allow for the release of built-up internal pressure in such situations, others have proposed the use of different forms of relief valves that permit internal gas to escape.

Although consumers have become more sophisticated in recent years with respect to the quality of the coffee they drink, they are also relatively inelastic when it comes to product pricing. This trend has required coffee roasters to be price and quality conscious, while providing a product that has good visual appeal to the customer. The advent of single serve coffee capsules has increased cost pressures as the packaging costs per pound of coffee increases significantly when the coffee is packaged in single serve capsules. Any form of relief valve used on coffee packaging must therefore take into account the effect on the overall cost of the packaged product.

Existing pressure relief valves for use on coffee packaging vary widely in structure, function, cost, and reliability. The ability to locate a valve on the interior surface of a package or to vary the opening and closing pressure for existing valves is currently minimal or non-existent. This can be a limiting factor in certain applications of the valves, including, for example, on single serve containers or capsules. Valves that are designed for use on larger coffee packaging (for example 1 kg packages) typically employ mechanical features that prevent them from working on small volume single serve capsules, where the volume of coffee present is too small to permit a build-up of pressure sufficient to activate the valve. In addition, while the amount of material required to manufacture current relief valves can vary from valve to valve, present valves generally require an amount of material that would typically be viewed as excessive if the valve were to be used on a single serve container or capsule. The popularity of single serve coffee brewers, which utilize a spigot to pierce the upper lid of the container and inject hot water into its interior, also presents challenges with respect to the use of currently available valves on single serve capsules. Current valves tend to be of a size and thickness that interferes with the puncturing of the lid of the container by the spigot in single serve brewers.

SUMMARY

The invention provides a one-way valve that permits the release of built-up gas from within a sealed container, vessel or package while eliminating or limiting the amount of atmospheric ingress through said valve and into the container, vessel or package. The valve has the added feature of being able to be manipulated in the manufacturing process so that the opening pressures and flow rates can be varied through the use of, but not limited to, multiple exhaust channels, sealant reservoirs, size, exhaust channel length and shape, the fluid dynamics of various sealants used if any, material, etc.

In one aspect, there is provided a one-way valve to control the release of pressurized gas from within a sealed container through a venting aperture within a surface of the container, the valve comprising a layer of flexible material having an upper and a lower surface, a portion of said upper surface adhered to a surface of the container such that said flexible material overlays the venting aperture, and a channel defined by a portion of the surface of the container and an adjacent portion of said flexible material which has not been adhered to the surface of the container, said channel in communication with said venting aperture in said container and in communication with an exhaust gas aperture in said layer of flexible material, said channel operable between a closed and an open configuration upon gas pressure within the container exceeding a predetermined limit, movement of said channel from said closed position permitting gas to flow from said container, through said venting aperture, through said channel, through said exhaust gas aperture and into the exterior atmosphere, when the gas pressure within the container is less than the predetermined limit said channel is in said closed position restricting the flow of gas between said venting aperture and said exhaust gas aperture.

In a further aspect there is provided a one-way valve to control the release of pressurized gas from within a sealed container through a venting aperture within a surface of the container, the valve comprising a layer of flexible material having an upper and a lower surface, a portion of said upper surface adhered to a surface of the container such that said flexible material overlays the venting aperture, a channel defined by a portion of the surface of the container and an adjacent portion of said flexible material which has not been adhered to the surface of the container, said channel in communication with said venting aperture in said container and in communication with an exhaust gas aperture in said layer of flexible material, said channel operable between a closed and an open configuration upon gas pressure within the container exceeding a predetermined limit, movement of said channel from said closed position permitting gas to flow from said container, through said venting aperture, through said channel, through said exhaust gas aperture and into the exterior atmosphere, when the gas pressure within the container is less than the predetermined limit said channel is in said closed position restricting the flow of gas between said venting aperture and said exhaust gas aperture, and one or more reservoirs in communication with said channel, said one or more reservoirs receiving sealant applied to said channel when gas flows through said channel to thereby assist in preventing the expulsion of sealant through one or both of said venting and said exhaust apertures.

In yet a further aspect there is provided a one-way valve to control the release of pressurized gas from within a single serve beverage capsule having a flexible lid with a venting aperture therethrough, when in use in a brewer a spigot piercing the flexible lid to inject liquid into the beverage capsule to form a liquid beverage, the valve comprising a layer of flexible material having an upper and a lower surface, a portion of said upper surface adhered to the flexible lid of the beverage capsule such that said flexible material overlays the venting aperture, and a channel defined by a portion of the flexible lid and an adjacent portion of said flexible material which has not been adhered to the flexible lid, said layer of flexible material adhered to said flexible lid such that said channel is formed between said flexible lid and said flexible material at a location on said flexible lid that does not intersect with the piercing of said flexible lid by the spigot, said channel in communication with said venting aperture and in communication with an exhaust gas aperture in said layer of flexible material, said channel operable between a closed and an open configuration upon gas pressure within the beverage capsule exceeding a predetermined limit, movement of said channel from said closed position permitting gas to flow from the beverage capsule, through said venting aperture, through said channel, through said exhaust gas aperture and into the exterior atmosphere, when the gas pressure within the beverage capsule is less than the predetermined limit said channel is in said closed position restricting the flow of gas between said venting aperture and said exhaust gas aperture.

BRIEF DESCRIPTION OF THE DRAWINGS

The drawings included herein will allow for a better understanding of the invention and will help to more clearly explain its function and how the invention may be carried into effect. Reference, to the drawings included in this document will attempt to show some of the preferred embodiments of the present invention in which:

FIG. 7 is a plan view of another embodiment of the invention applied to an interior surface of a container.

FIG. 8 is a cross sectional view taken along the line 8-8 of FIG. 7.

FIG. 9 is a cross sectional view taken along the line 9-9 of FIG. 7.

FIG. 10 is a general schematic view showing the flow of gas through the valve of FIG. 7.

DESCRIPTION

The present invention may be embodied in numerous different forms. However, the following drawings, specifications and descriptions disclose only a select few of these specific forms of the invention and thus are not intended to limit the invention as defined in the claims included herein.

Figure 1:
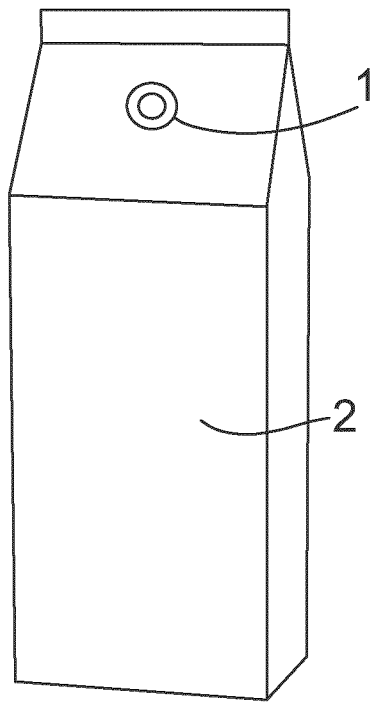
FIGS. 1 and 2 represent views of exemplary vessels to which a one-way valve in accordance with an embodiment of the invention has been applied.
Figure 2:
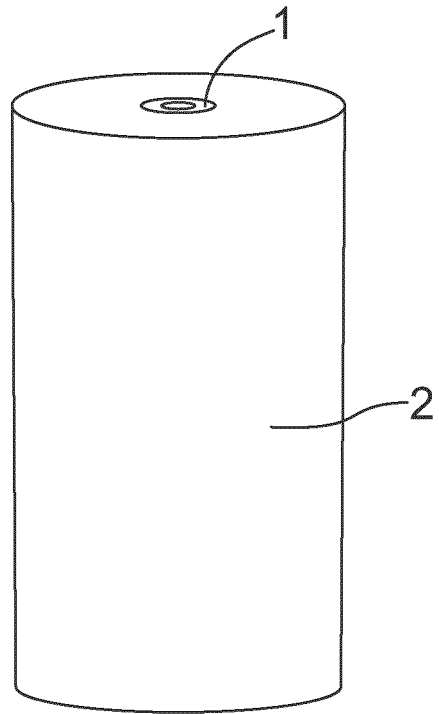
Figure 3:
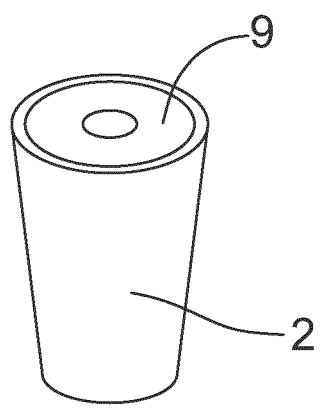
FIG. 3 is an upper side perspective view of a single serve container or capsule to which a one-way valve in accordance with an embodiment of the invention has been applied.
Figure 4:
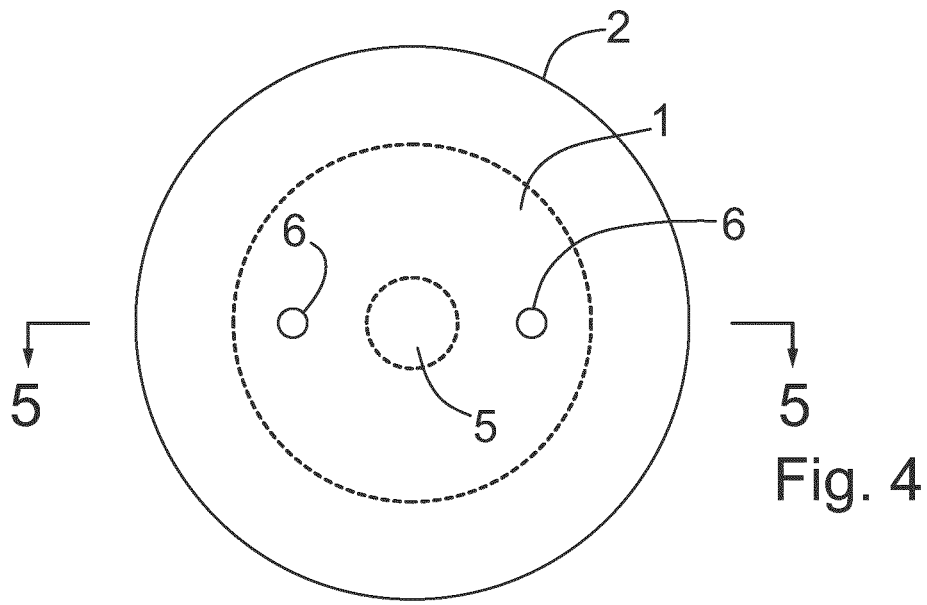
FIG. 4 is a plan view of an embodiment of the invention applied to an interior surface of a container.
Figure 5:
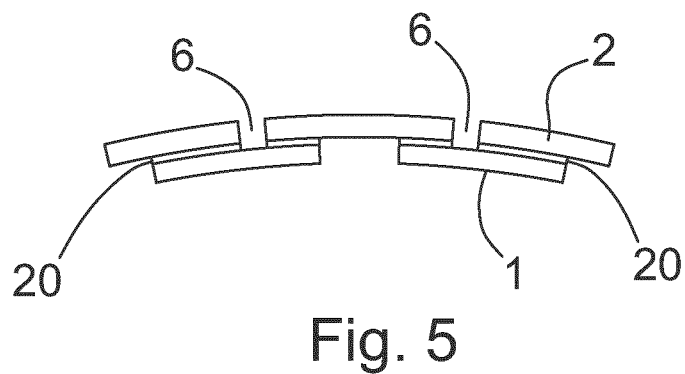
FIG. 5 is a cross sectional view along the line 5-5 of FIG. 4.
Figure 6:
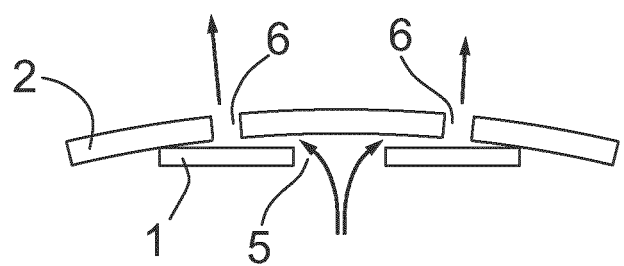
FIG. 6 is a general schematic view showing the flow of gas through the valve of FIG. 4.

In the attached Figures, a valve constructed in accordance with preferred embodiments of the invention is noted generally by reference numeral 1. It will be appreciated that valve 1 may be applied to a wide variety of different forms, types and constructions of containers or vessels 2, and that for any particular container, the valve may be applied to a variety of different locations and surfaces of the container. For example, FIG. 1 represents a somewhat standard rectangular container that is commonly used for food products (for example coffee) having a right prism top. In this instance valve 1 is shown as being applied to a side surface of the top portion of the container. Container 2 in FIG. 2 is shown in the form of a right cylinder (for example a coffee can) wherein valve 1 is applied to the upper or top surface of the cylinder. The container 2 in FIG. 3 represents a generic single serve capsule, as is commonly used in single serve coffee brewers/infusers. It will be appreciated by those with a detailed understanding of the invention that container 2 in FIG. 3 could be made from a wide variety of materials and rigid structures that are currently available, including as but not limited to, rigid plastic, nylon, metal, composite or glass to semi rigid plastic, cellulose or metalized containers, to flexible containers manufactured from plastics, foils, biodegradable films, or other flexible materials. In each instance, in accordance with the invention container 2 preferably has at least one venting aperture through which the build up of excess gasses from within the said container can escape.

It will be noted that in each case, the valves shown in FIGS. 1, 2 and 3 are applied to the top portion of the container such that when the containers are in their normal upright position the contents of the container will not impinge directly upon the valve or the surface of the container over which the valve is being applied. In other instances it may be possible or desirable to locate the valve on other surfaces of the container, including interior surfaces that are in direct contact with the contents of the container. Where the valve is on the exterior of the container, the outer surface of the valve may contain rails or stand-offs to help prevent contact between the operating portions of the valve and other objects that may come into contact with the valve and/or the container, that may otherwise interfere with the functioning of the valve.

In a number of the attached Figures the container surface to which valve 1 is applied is shown as arcuate in cross-section. The arcuate shape of the container surface is meant to signify a pressurized container formed from a flexible material, such as would be the case of a foil lid on a single serve container or capsule. For illustration purposes valve 1 in the attached Figure is in most instances shown as it would be applied to an interior surface of a container. It will be appreciated that in some instances the valve may be applied to an exterior surface of a container.

In accordance with an embodiment of the invention, valve 1 is comprised generally of a layer of flexible material having an upper surface 3 and a lower surface 4. In some embodiments valve 1 may be essentially a single layer of material that gains its functionality, at least in part, by adherence to a surface of container 2. The material from which the valve is formed can vary, and in some instances may be expandably resilient. As mentioned, valve 1 may be applied to an inside surface of container 2 or, alternatively, to an outside surface of the container. In either instance, the surface of the container about which the valve is applied will have at least one hole, opening, or venting aperture 6 therethrough to permit the escape of pressurized gas from within the container outwardly and into the exterior environment. The venting aperture can be located at various different locations or on various surfaces on the container. The venting aperture could be formed during the construction of the container, during the construction of the valve, or during the construction of the lid material where the container has a designated or separable lid and the valve is to be integrated into the lid. Alternately, the venting aperture could be drilled, punched or otherwise formed subsequent to the manufacture of the container or the lid.

The flow of pressurized gas from within the container to the exterior environment will be controlled and/or regulated by valve 1, regardless of whether the valve is applied to the interior or exterior surface of the container. To accomplish that goal, valve 1 will include an exhaust gas aperture 5 that will, under certain conditions, be in communication with the hole, opening or venting aperture 6. Again it will be appreciated that gas aperture 5 and venting aperture 6 may be in the form of any one of a very wide variety of different physical structures which could include, but are not limited to, a small round or otherwise shaped opening, a slit, overlapping materials that may be in the form of a flap, etc. The physical structure and configuration of gas aperture 5 and venting aperture 6 is not as critical as is the ability for the respective apertures to permit the flow of gas therethrough under certain conditions.

Valve 1 is preferably adhered or otherwise secured to a surface of container 2 through chemical or mechanical means. In most instances it is expected that the valve will be glued (with adhesive 20) or heat sealed in place. In many cases, it is expected that a form of adhesive will be applied to the surface of the flexible material that is to be adhered to the surface of container 2 such that bringing the respective surfaces into contact adheres the valve to the container in a manner that results in the valve effectively overlaying venting aperture 6.

In accordance with an embodiment of the invention there is provided one or more channels 7 connecting gas aperture 5 and venting aperture 6. It will be appreciated that in alternate embodiments multiple apertures 5 may be connect to multiple apertures 6 by way of multiple channels 7. Channel 7 may be created through the application of adhesive to the flexible material in a predetermined manner such that adhesive is not applied to at least a portion of the material, leaving a portion of the valve surface free from adherence to the container, thus forming channel 7. That is, channel 7 will be formed and defined by both the valve material and the surface of the container. Channel 7 may also be formed through embossing, printing or otherwise forming the channel within the layer of flexible material from which the valve is formed.

Depending upon the particular application for valve 1 (which may include a consideration of factors such as the type and volume of material to be retained in the container, the amount of gas expected to evolve from material within the container, the expected pressures to which the valve will be subjected, etc.), the configuration, shape, and physical dimensions of channel 7 can be adjusted and designed as appropriate. Some exemplary configurations for channel 7 are shown in the attached Figures. For example, in the embodiment of FIG. 7, channel 7 is shown as being relatively circular and extending through of an arc of approximately 290 degrees. Channels extending through a lesser or greater arc could be equally be used, as could also channels that effectively spiral about the valve or that extend from gas aperture 5 to venting aperture 6 in another route or fashion.

Depending on the materials from which the container (or lid if the valve is to be attached to the lid) and valve are formed, the addition of a sealant between the container/lid and the valve may be desirable to both help to control the "opening" and "closing" pressure for the valve and to help prevent an undesired leakage of gas through the valve, in either direction.

Although not shown in the attached drawings, in an alternate embodiment gas aperture 5 could be positioned along a peripheral edge of valve 1 and effectively formed through a failure to apply adhesive or to otherwise adhere a portion of the peripheral edge of the valve to the surface of container 2. In that embodiment, channel 7 would extend from venting aperture 6 and terminate at the portion of the peripheral edge of valve 1 which is not being directly adhered to the surface of container 2.

When not subjected to the stresses and strains of a pressurized container, the unadhered surface of valve 1 (which will largely be channel 7) will typically lie against or fairly close to the adjacent surface of container 2 (ie. the channel will be in a "closed", collapsed, or rest configuration), thereby limiting or restricting the flow of gas through the channel. In the case where gas pressure within container 2 builds and generally exceeds a predetermined level, gas will have a tendency to enter channel 7 through venting aperture 6 and expand or "open" the channel (to an expanded or "open" configuration) through lifting or otherwise separating the unadhered valve surface from the container surface, providing a flow channel from venting aperture 6 to gas aperture 5. Once again, depending upon the particular application at hand, the physical dimensions of channel 7 (including its cross-sectional area and shape, as well as the length of the channel) in combination with the form of material from which valve 1 has been made, will have an impact upon the ability of pressurized gas to flow through the channel and out gas aperture 5. For example, a channel having a small cross sectional area with a long circuitous route from venting aperture 6 to gas aperture 5, wherein the valve material has a surface exhibiting a high coefficient of friction, will generally have a greater tendency to restrict the flow of gas therethrough than a channel of considerably greater cross-sectional area that is very short and that provides a straight or direct route from venting aperture 6 to gas aperture 5, and/or wherein the valve material has a low coefficient of friction. In some instances a valve formed from a readily expandable material may permit an enhanced gas flow over a valve that is formed from a material that is more inelastic. That is, the valve may be formed from a flexibly resilient material that exhibits characteristics of elasticity such that gas channels or passageways within the valve may be forced open and physically expand under pressure. Alternately, the channels may not expand per se, but rather may simply "open" through the application of sufficient pressure. Thus it will be appreciated that "opening" a channel could entail physically expanding the material from which the channel is formed, lifting the walls of the channel from a collapsed position with the application of pressure but without physically expanding the channel material, and/or forcing sealant out from within a channel or forcing sealant within a channel to its outer edges or surface. The variance in shape and length of such channels, their location within the valve, and the use of sealant (if any) within the channels, along with design of the path of the channel, can all impact the "opening" and "closing" pressures for the channels and thus the valve in general, as well as gas flow rates. Further, the channel may include a restriction or a dam to reduce or retard the flow of sealant through said channel and to assist in preventing the expulsion of sealant through said venting and exhaust gas apertures.

It will therefore be appreciated that the physical design of the size and shape of channel 7, in conjunction with the material from which valve 1 is constructed, in many cases can be sufficient to present a desired degree of "control" over the passage of gases through the channel and out of container 2 to the interior of the container.

In an embodiment of the invention, to further "control" the movement of gas through channel 7, a sealant can be inserted or placed into channel 7 and between the surface of the container and the adjacent surface of valve 1. It is expected that in many instances the sealant will be a relatively low viscosity liquid that is able to "flow" or move upon the application of pressure. The particular choice of the material from which the sealant is formed will in many cases depend upon the product stored within the container and the properties of the gas that may evolve from that product or the exterior environment within which the container is to be stored. For example, sealants that readily break down when exposed to oxygen may not be desirable where the container is to be stored in an exterior environment that contains oxygen. Similarly, sealants that are toxic to humans may not be desirable in situations where valve 1 is to be applied to food containers. In situations where valve 1 is to be used on containers that store coffee, commonly the sealant would be vegetable oil, bees wax, or some other form of edible oil or similar product.

Regardless of the particular type of sealant that is utilized, the function of the sealant is to help to "seal" channel 7 and prevent, restrict, or limit the flow of gases therethrough, except under desired conditions. Sealant applied within channel 7 will have a tendency to fill small gaps between the materials and to maintain contact between the surface of the container and the adjacent valve surface (in effect bridge the two surfaces and increase cohesion between the two surfaces), which will effectively increase the amount of pressure that must be applied to the valve before channel 7 will "open" (or "expand") and permit the flow of gas therethrough. The sealant may also serve the function of reducing the cross-sectional area of channel 7, thereby helping to restrict the flow of gas through the channel even when the channel is "open".

In an embodiment of the current invention, valve 1 includes one or more sealant reservoirs 8 that are in communication with channel 7. From a thorough understanding of the invention it will be understood that the one or more reservoirs may be an enlarged portion of channel 7 or, alternately, may be a separate structure in communication with channel 7. Further, in an embodiment of the invention the volume of reservoir 8 is greater than or equal to the volume of channel 7, or that portion of channel 7 that does not define the reservoir.

Figure 15:
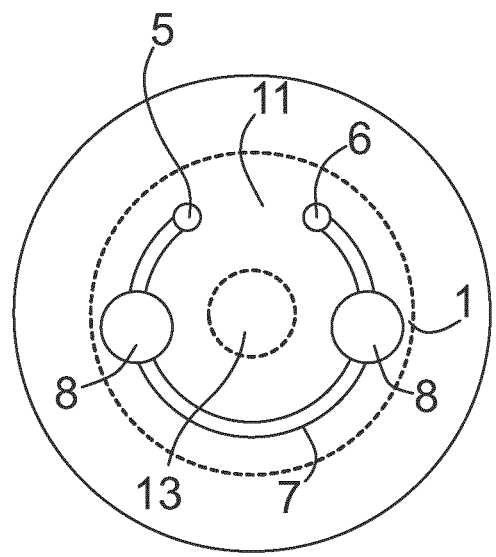
FIG. 15 is a plan view of an embodiment of the valve of the present invention showing two apertures and depicting two sealant reservoirs that sealant can migrate into when excess gas pressure builds up within the vessel.
Figure 16:
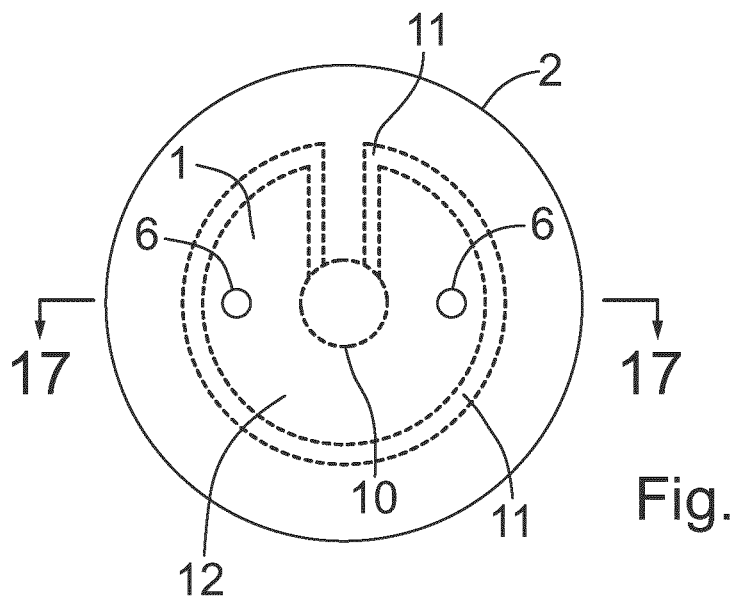
FIG. 16 is a plan view of an alternate embodiment of the present invention shown applied to the inner surface of the lid portion of a single serve container or capsule.

Traditionally, others have avoided the use of large volumes of sealant within such valves as an excessive amount of sealant can both leak out of the valve and can result in an over pressurization of the interior of container 2 as the internal pressure must build to a higher than desired level in order to effectively drive the sealant out of the valve before it can "open". In an embodiment of the present invention, a large, or what traditionally would be considered to be an excessive, amount of sealant is inserted within channel 7. Since channel 7 is in communication with one or more sealant reservoirs 8 there is presented a cavity into which sealant can flow when under pressure. For example, the embodiment shown in FIG. 15 depicts a channel 7 having two sealant reservoirs 8. In this embodiment, as pressure within container 2 builds, gas will flow through venting aperture 6 (or gas aperture 5 depending on whether the valve is applied to an exterior or interior surface of the container) and into channel 7. Channel 7 will preferably be filled or partially filled with sealant such that the pressure drives the sealant into one, or both, of reservoirs 8. Once a sufficient amount of the sealant has migrated into one or both of the reservoirs to allow for an "opening" of channel 7, gas will be permitted to flow through the channel and out gas aperture 5 (or 6 as the case may be). In this manner, the type and volume of sealant can be used to "fine tune" the valve so that valve 1 opens only when the internal pressure within container 2 reaches an approximate desired level that forces the sealant to flow into reservoir 8, while at the same time preserving the sealant within reservoirs 8 such that it is not expelled and lost to the exterior environment. When the pressures within container 2 subside, the sealant will tend to be "wicked" back into channel 7. Compression forces that will be applied to the sealant, and in particular to reservoirs 8, by the valve surface when the pressure within the container has been reduced will also tend to force the sealant back into channel 7. As the sealant flows back into channel 7 it will help to "reseal" the channel and prevent the leakage of atmospheric air backwardly through the valve and into the container.

Figure 11:
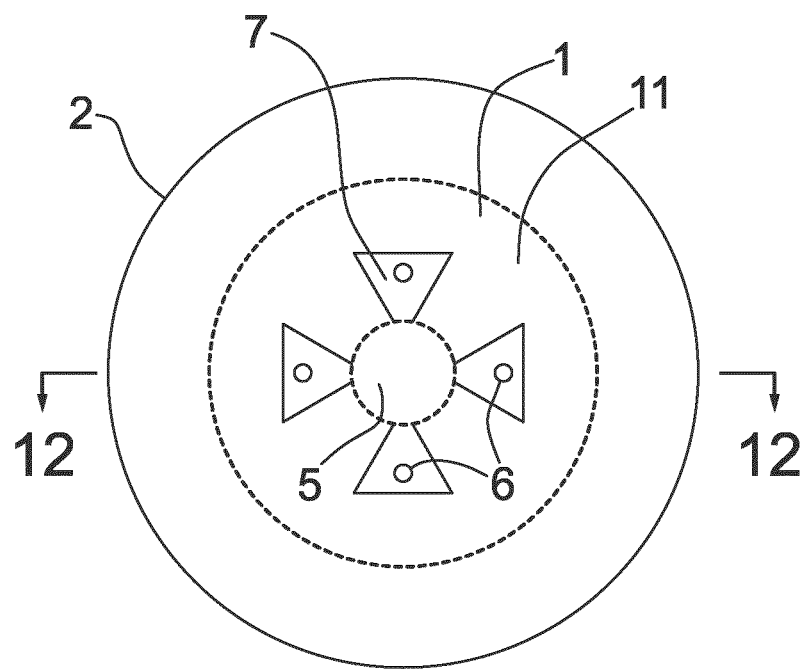
FIG. 11 is a plan view of a third embodiment of the invention wherein the valve is a 2-layer valve and is applied to an interior surface of a container.
Figure 12:
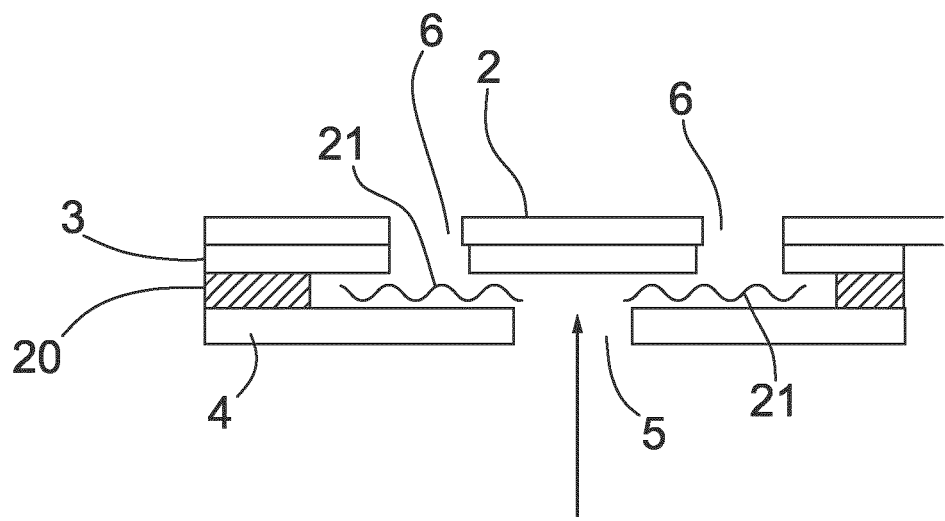
FIG. 12 is a cross sectional view taken along the line 12-12 of FIG. 11.

A further embodiment of valve 1 is shown in FIGS. 11 and 12. Here, valve 1 is effectively a 2-layer valve that is applied to the inner surface of the container. In this instance there are four channels that are generally triangular shaped and that are in communication with four apertures 6 within container 2. A sealant within channels 7 becomes dammed up or builds up at the open apex of the triangular channels to help prevent leakage of atmospheric air into the container. In other embodiments valve 1 may be comprised of a first and a second layer of flexible material that are adhered together such that channel 7 (and any associated reservoir or reservoirs) is formed between the two layers. Aside from being formed from two layers, the 2-layer valve will generally perform the same as the described single layer valve.

Figure 13:
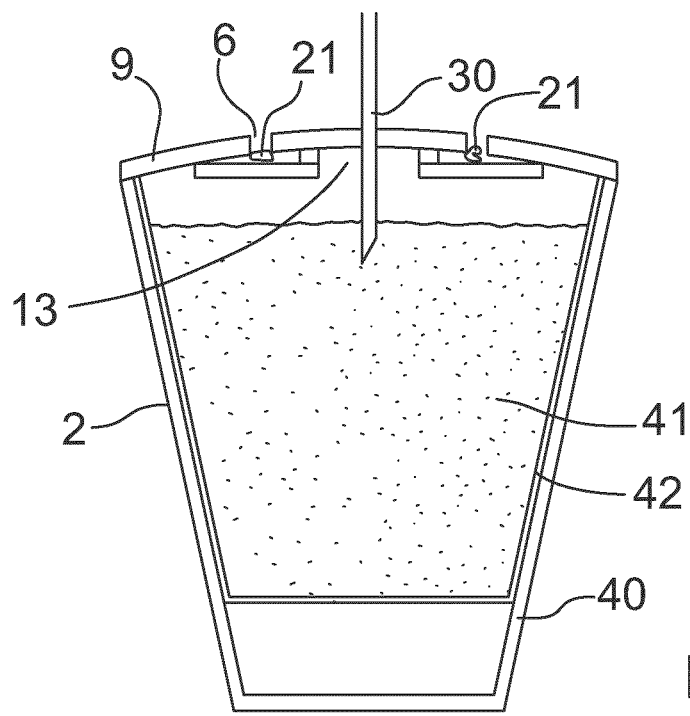
FIG. 13 is a vertical cross sectional view of a single serve capsule having a valve in accordance with an embodiment of the invention applied to the inside of the upper lid of the capsule, the valve ensuring that the coffee brewer spigot does not come in contact with any operative part thereof.
Figure 14:
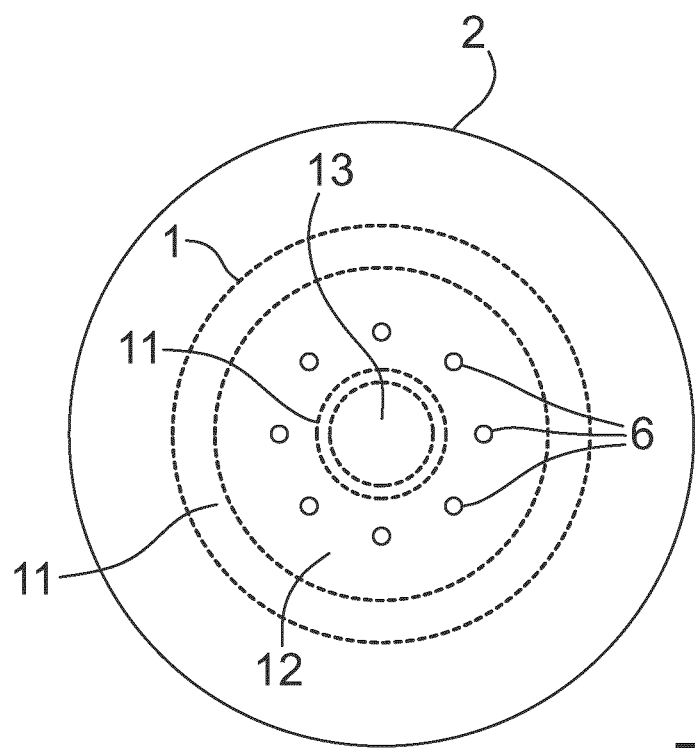
FIG. 14 is a plan view of an embodiment of the valve of the present invention applied to an inner surface of a container or vessel and indicating an unattached section allowing a space for sealant to migrate and to lower tension when the valve is stressed allowing for a reduced opening pressure.

In another aspect of the invention, gas aperture 5 and channel 7 are positioned about the valve in a manner that facilitates the application of the valve to the upper surface of a single serve capsule, such as that shown in FIGS. 3 and 13. Such capsules are typically formed from a rigid exterior shell 40 having therein a volume of coffee or other such product 41 retained within a filter 42. A flexible upper surface or lid 9 retains the product within shell 40. In many single serve capsules the upper surface or lid 9 is a foil or film product that is pierced by a spigot 30 of the coffee brewing or infusion machine. Such coffee machines, and the single serve capsules designed for use therein, are structured so that the spigot pierces the upper surface or lid of the capsule at or about its center. It is therefore important for the functionally operating sections of valve 1 to be positioned about the upper surface or lid of the capsule in a manner that does not interfere with the spigot. The centre portion 13 of valve 1 may therefore be devoid of any gas apertures or channels, thereby permitting the spigot to pierce through the valve without compromising the valve's integrity or its function. Further, the construction of the applicant's valve may be such that the central portion of the valve (and that portion that ultimately will be pierced by the spigot) is devoid of valve material. In this way, it only becomes necessary for the spigot to pierce the lid of the capsule. That is, the spigot will not come into contact with any portion of valve 1 and need only pierce the lid of the capsule, just as in the case where no valve is present (see FIG. 14). The spigot will also not come into contact with any sealant that may be used within the valve.

To this end, when used on a single serve container or capsule, valve 1 may alternately be in a generally donut, U, horseshoe or of a similar shape such that the valve effectively surrounds the centre portion of lid 9 without adding any material to that portion of the lid that is pierced by the spigot. The functionality of the valve will not be affected by the spigot, nor will there be any increased thickness of material on lid 9 that will impede the spigot's entry into the capsule. In such cases, channel 7 will typically be arcuate in shape (see FIGS. 7 and 15).

Figure 17:
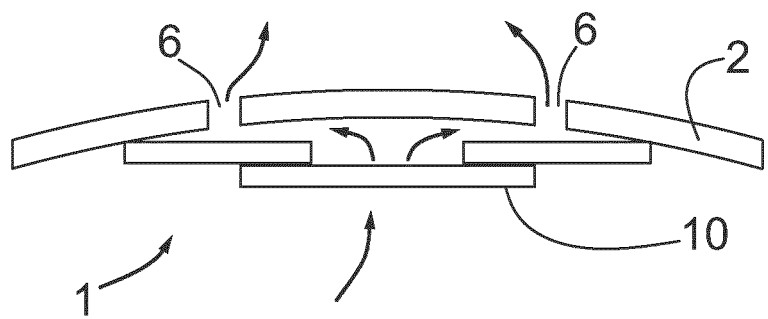
FIG. 17 is a cross sectional view of an embodiment of the valve of the present invention applied to the inside of a vessel wherein the valve includes a filtering mechanism.

As shown in FIG. 17, in some instances it may be desirable to incorporate a filter material 10 adjacent to one or both of venting aperture 6 and exhaust gas aperture 5 to limit ingress of dirt or debris. Where valve 1 is mounted on an interior surface of the container the use of filter material will also help to prevent the movement of the contents of the container into the interior of the valve, and in particular channel 7.

It will thus be appreciated that valve 1 presents the ability to permit excess pressure that builds within container 2 to exit the valve and into the exterior environment, while at the same time preventing or limiting the flow of air or gases exterior to the container into its interior. Through the construction of channel 7 and/or the incorporation of sealant reservoirs, the applicant has been able to construct a valve that functions effectively and that can be applied as a single layer to either an interior or an exterior surface of the container. Such a valve can thus be manufactured relatively inexpensively, thereby enhancing the ability of the valve to be utilized on a single serve container. A single layer valve may also be constructed with an "open" central portion so as to avoid interference with the spigot as it pierces lid 9 of a single serving capsule.

It is to be understood that what has been described are the preferred embodiments of the invention. The scope of the claims should not be limited by the preferred embodiments set forth above, but should be given the broadest interpretation consistent with the description as a whole. For example, while particular embodiments of the invention have been described and shown in the attached drawings, it will be appreciated that other embodiments are possible.

We claim:

1. A one-way valve to control the release of pressurized gas from within a single serve beverage capsule having a flexible lid with a venting aperture therethrough, when in use in a brewer a spigot piercing the flexible lid to inject liquid into the beverage capsule to form a liquid beverage, the valve comprising:

a layer of flexible material having an upper and a lower surface, a portion of said upper surface adhered to the flexible lid of the beverage capsule such that said flexible material overlays the venting aperture, said flexible material including a generally centrally located opening therethrough, said opening aligned with an area of said flexible lid that is pierced by said spigot such that during operation of the brewer said flexible material is not contacted by the spigot, and a channel defined by a portion of the flexible lid and an adjacent portion of said flexible material which has not been adhered to the flexible lid, said layer of flexible material adhered to said flexible lid such that said channel is formed between said flexible lid and said flexible material at a location on said flexible lid that does not intersect with the piercing of said flexible lid by the spigot, said channel in communication with said venting aperture and in communication with an exhaust gas aperture in said layer of flexible material, said channel operable between a closed and an open configuration upon gas pressure within the beverage capsule exceeding a predetermined limit, movement of said channel from said closed position to said open position permitting gas to flow from the beverage capsule, through said venting aperture, through said channel, through said exhaust gas aperture and into the exterior atmosphere; and when the gas pressure within the beverage capsule is less than the predetermined limit said channel is in said closed position restricting the flow of gas between said venting aperture and said exhaust gas aperture.

2. The valve as claimed in claim 1 wherein said channel includes a reservoir containing a sealant.

3. The valve as claimed in claim 2 wherein the volume of said reservoir is greater than or equal to the volume of that portion of said channel that does not define said reservoir.

4. The valve as claimed in claim 3 wherein said channel includes a reservoir associated with each of said venting aperture and said exhaust gas aperture, said reservoirs receiving said sealant therein and assisting in preventing the expulsion of sealant through said venting and exhaust gas apertures upon the movement of gas through said channel.

5. The valve as in claim 1 including a filter adjacent to one or both of said venting aperture and said exhaust gas aperture to limit ingress of dirt, debris or other material therein.

6. The valve as claimed in claim 1 wherein said channel is generally arcuate and extends about the flexible lid in a manner that does not intersect with the spigot during operation of the brewer.

* * * * *